United States Patent [19]

McDonough

[11] Patent Number: 4,974,759
[45] Date of Patent: Dec. 4, 1990

[54] RADIO/PLAYER ASSEMBLY

[76] Inventor: William H. McDonough, 28 Newton Ave., Lynn, Mass. 01905

[21] Appl. No.: 388,291

[22] Filed: Aug. 1, 1989

Related U.S. Application Data

[63] Continuation of Ser. No. 130,988, Sep. 10, 1987, abandoned.

[51] Int. Cl.$^5$ .............................................. B62J 11/00
[52] U.S. Cl. .................................. 224/39; 224/30 A; 224/31; 224/35; 381/86; 381/188; 381/205
[58] Field of Search ..................... 224/30 A, 30 R, 41, 224/39, 35, 31; 381/24, 86, 87, 188, 205; 455/99, 345, 346, 344, 350, 351

[56] References Cited

U.S. PATENT DOCUMENTS

| | | | |
|---|---|---|---|
| 2,490,563 | 12/1949 | Van Gastle | 381/86 |
| 2,588,671 | 3/1952 | Tringali | 224/41 |
| 3,976,162 | 8/1976 | Cummings | 381/24 |
| 4,303,807 | 12/1981 | Sato | 381/87 |
| 4,436,350 | 3/1984 | Jolin | 224/41 |
| 4,441,577 | 4/1984 | Kurihara | 381/86 |
| 4,445,228 | 4/1984 | Bruni | 224/41 |
| 4,450,495 | 5/1984 | Naruki | 455/350 |
| 4,596,370 | 6/1986 | Adkins | 224/30 A |
| 4,662,547 | 5/1987 | Villanueva et al. | 224/41 |
| 4,697,725 | 10/1987 | Miree | 224/30 A |

FOREIGN PATENT DOCUMENTS 332324 7/1930 United Kingdom ................ 455/351

OTHER PUBLICATIONS

Audio Cannon TM Advertisement; Motorcyclist, Aug. 1985, p. 19.

Primary Examiner—Linda J. Sholl
Attorney, Agent, or Firm—Kenway & Crowley

[57] ABSTRACT

A dual-use radio/player assembly is provided in which a radio/player holder is pivotably and removably mounted to a cycle. The holder has at least a pair of speakers pivotably mounted thereto and the speakers are electrically connected with a radio or recording medium player mountable on the holder. The speakers are pivotable partly away from the holder in an open configuration and pivotable close to the holder in a compact configuration; the holder and speakers being readily detachable from the cycle as a theft-prevention measure. The radio/player assembly of the invention is pivotably mounted to the handlebars or frame of a cycle and can be positioned in various attitudes and orientation.

12 Claims, 4 Drawing Sheets

RADIO/PLAYER ASSEMBLY

This is a continuation of application Ser. No. 07/130,988, filed Sept. 10, 1987, now abandoned.

BACKGROUND OF THE INVENTION

1. Field of the Invention

This invention relates to an audio system for cycles, particularly a sound system mountable to the cycle.

2. The Prior Art

Increasingly users of cycles such as bicycles and motor cycles are desirous of attaching a sound system to their cycles and usually to the handlebars thereof. By "sound system" as used herein, is meant radios and/or recording medium players e.g. cassette players, disc players and the like and one or more speakers electrically connected thereto.

Attempts have been made to provide such sound systems for cycles. See for examples, U.S. Pat. No. 2,588,671 to Triangali (1952); U.S. Pat. No. 4,436,350 to Jolin (1984); and U.S. Pat. No. 4,662,547 to Villanueva et al (1987). These are all sound systems mounted to the handlebars of the respective motorcycle or bicycle, the speakers being fixed relative to the radio/player and all requiring tools for the removal thereof from the handlebars of the cycle, which discourages removal thereof when leaving the cycle, for anti-theft purposes.

There is therefore, a need and market for a sound system mountable to cycles which overcomes the above prior art shortcomings.

There has now been discovered a sound assembly mountable to cycles, which is readily removable without the use of tools, for anti-theft purposes and in which the audio holder and speakers are relatively pivotable for positioning on the cycle in the desired attitude and orientation.

SUMMARY

Broadly, the present invention provides a dual-use radio/player assembly comprising a radio/player holder removably mountable to a cycle, the holder having at least one speaker pivotably mounted thereto, the speaker having conductive means for electrically connecting with a radio or recording medium player mountable in the holder, the speaker being pivotable partly away from the holder in a open configuration and pivotable close to the holder in a compact configuration, the holder and speaker being readily detachable from the cycle, as a theft prevention measure.

In a preferred embodiment, the assembly is pivotably mounted to a clamp, mounted in turn on the cycle so that such assembly can be mounted either to the handlebars or the frame of the cycle, yet the assembly can be pivoted to the desired position thereon with the holder and speaker or speakers being further relatively pivoted to the desired attitude and orientation on the cycle.

By "radio/player" as used herein, is meant to include a radio or recording medium player, including a cassette player, a tape player, a disc player and the like mountable to the holder of the invention.

BRIEF DESCRIPTION OF THE DRAWINGS

The invention will become more apparent from the following detailed specification and drawings in which.

DESCRIPTION OF PREFERRED EMBODIMENT

Figure 1:
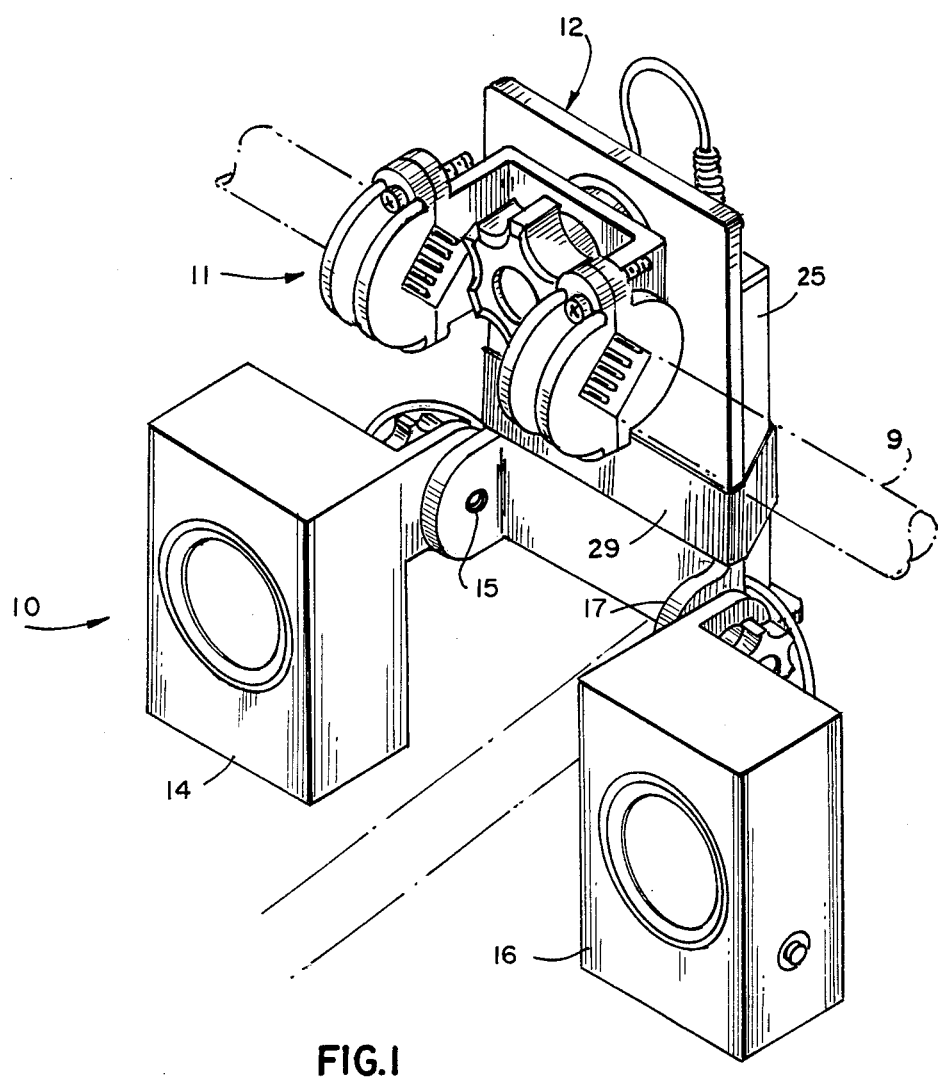
FIG. 1 is a perspective view of the sound assembly embodying the present invention.

Referring in more detail to the drawings, sound assembly 10 is mounted by clamping means 11 to handlebars 9 of a bicycle, as shown or indicated in FIG. 1. The sound assembly 10 has a holder 12 for a radio or recording medium player e.g. cassette or disc player and the like, with stereo speakers 14 and 16 mounted to holder 12, as shown in FIG. 1.

The holder 12 is pivotably mounted on a clamp 11, while the speakers 14 and 16 are pivotably mounted to the holder 12, at pivot points 15 and 17, as shown in FIG. 1. Thus, the speakers 14 and 16 can be pivoted upwardly and alongside of the radio/player holder 12, as shown or indicated in FIG. 4 or can be pivoted away from the holder, e.g. as shown in FIG. 1.

Figure 2:
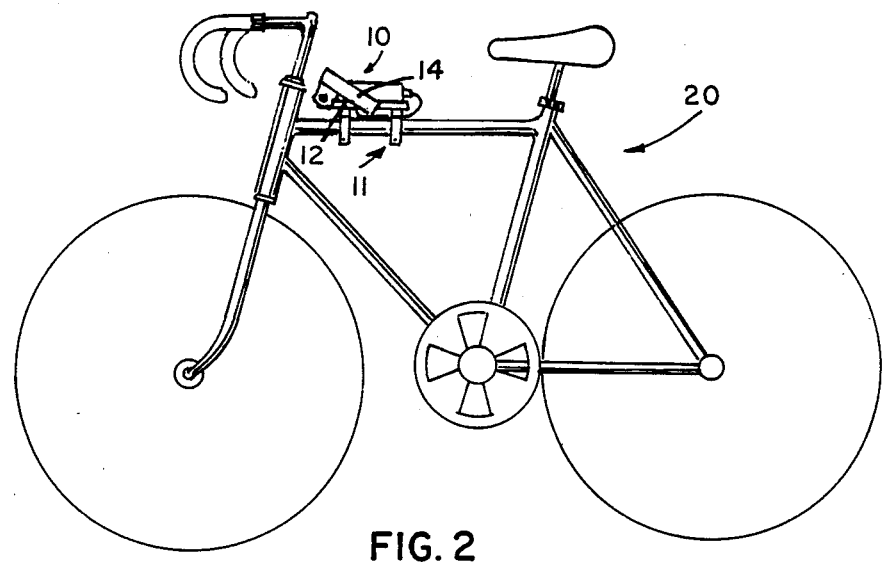
FIG. 2 shows the sound assembly embodying the invention mounted on the frame of a bicycle.
Figure 3:
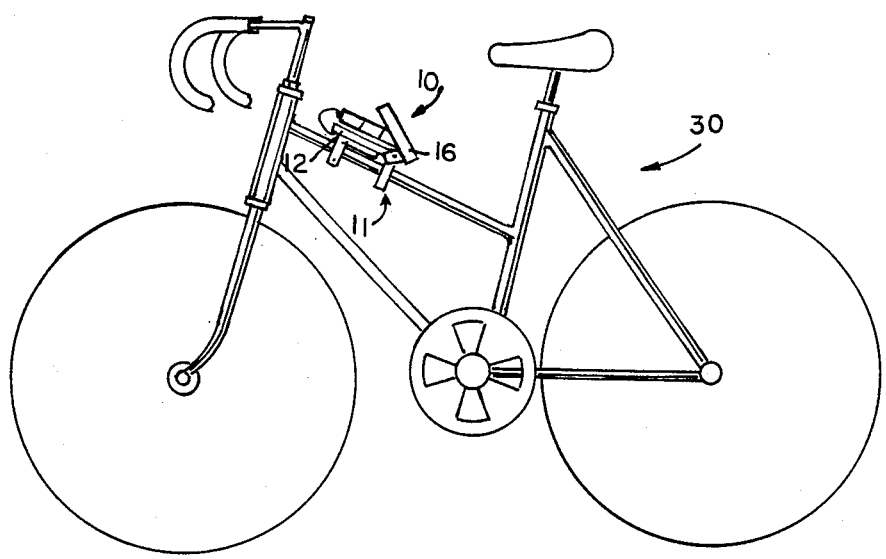
FIG. 3 shows the sound assembly of the invention mounted on the frame of another bicycle assembly.
Figure 4:
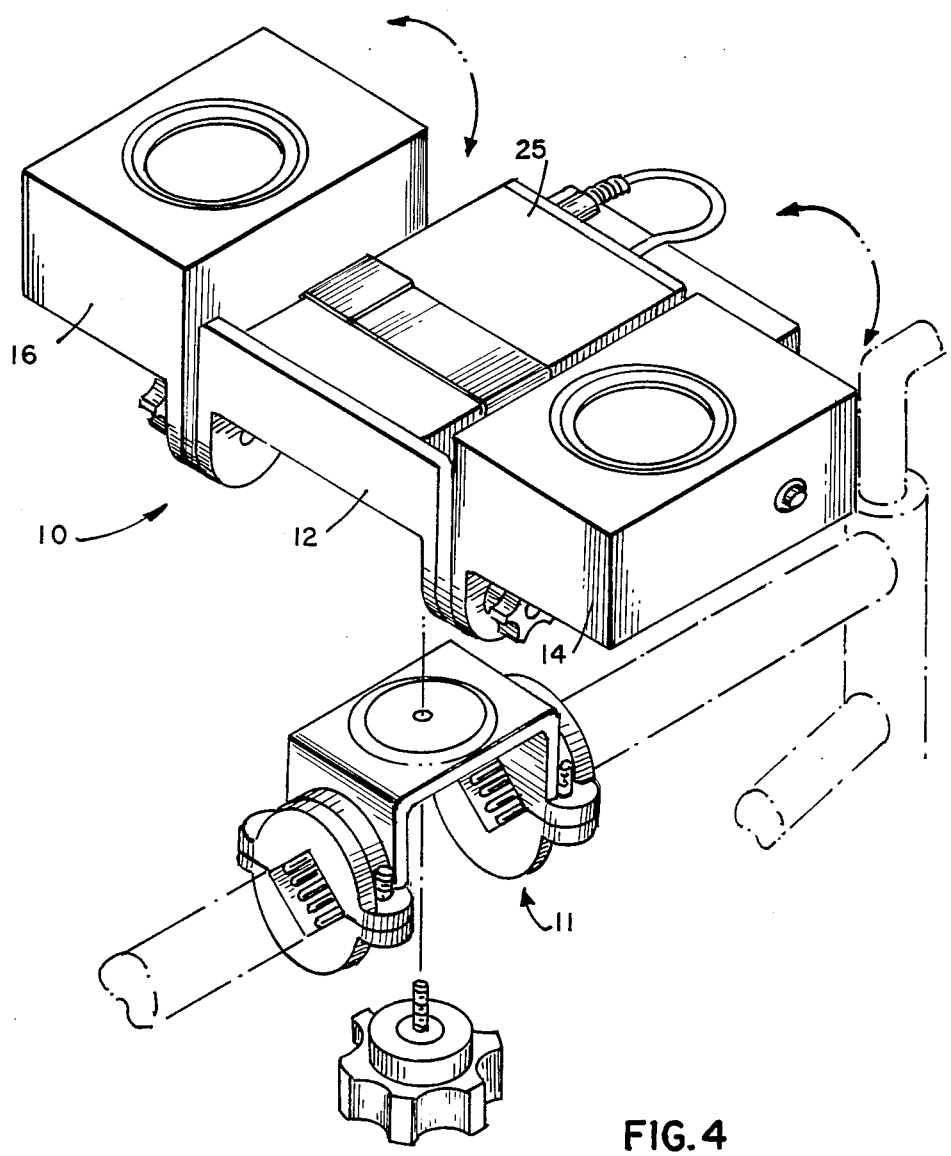
FIG. 4 is a perspective view of the sound assembly embodying the invention mounted on the frame of a bicycle and FIG. 5 shows a sound assembly embodying the invention in an off-bicycle configuration.

The radio/player assembly 10 is mountable on the handlebars of a cycle per FIG. 1. Alternatively, the sound assembly 10 of the invention can be mounted on the frame of a boy's bicycle 20, as shown in FIGS. 2 and 4 or on the frame of a girl's bicycle 30, as shown in FIG. 3 and in the manner indicated in FIG. 4. The radio/player holder 12 is pivoted in a desired orientation to the clamp thereof 11 and to the respective bicycle frames 20 and 30, as indicated in FIGS. 2, 3 and 4. Also the speakers 14 and 16 can be pivoted (relative to the holder 12) to the attitude desired by the bicycle operator, as indicated in FIGS. 2, 3 and 4.

Figure 5:
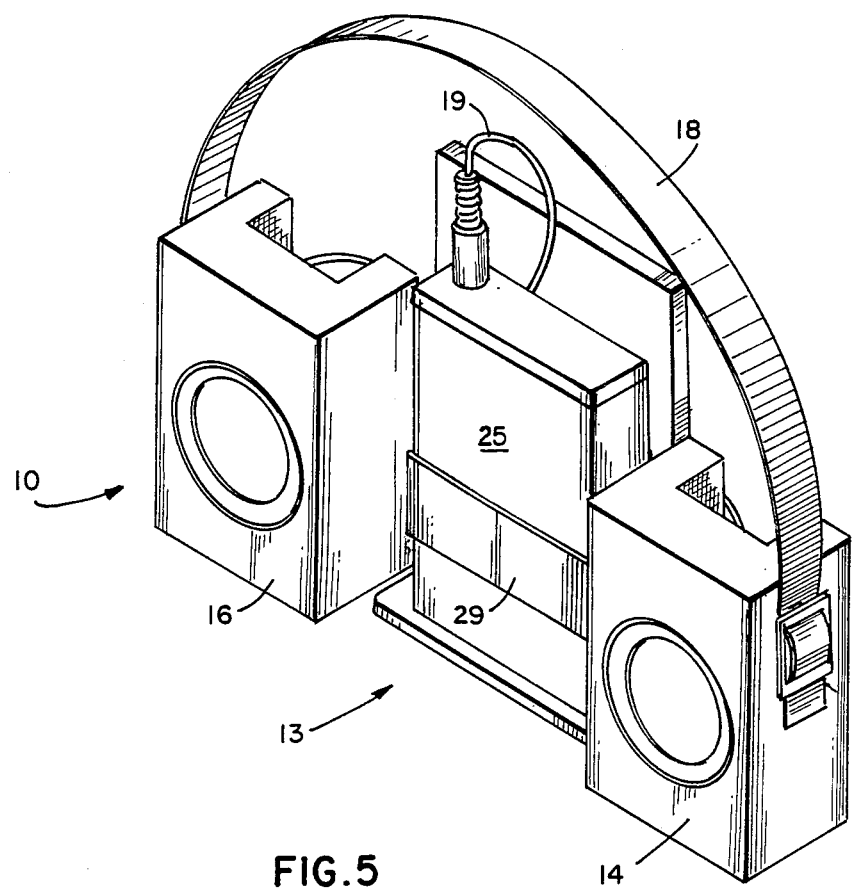

The speakers 14 and 16 can be pivoted upwardly and alongside of radio/player holder 12 and such assembly can be removed from the bicycle with a strap 18 added, to form a portable stereo radio/player assembly 13, as shown in FIG. 5. The holder 12 can, as indicated above, support e.g. a radio receiver or cassette player which is connected to, the speakers 14 and 16 by an electrically conductive jack 29, which also serves as a radio antenna, as shown or indicated in FIG. 5.

The radio/player may be mounted to the holder by various fastening means, including screws, elastic bands, magnets, cord and the like. Preferably, however, the radio/player 15 is mounted to the holder by one or more pair of velcro strips, e.g. strip 19, as shown in FIG. 5.

As discussed above, the radio/player assembly 10 embodying the invention can be mounted to the handlebars or frame of a cycle and pivoted or positioned in various orientations relative thereto, two examples of which are shown in FIGS. 2 and 3, wherein the radio/player assembly 10 of the invention is pivoted 180 on the bicycle frame in FIG. 2 from the bicycle frame in FIG. 3. Likewise, the radio/player assembly embodying the invention can be pivoted such that the holder rests before, behind or on top of the handlebars, one example of which is shown in FIG. 1, the speakers positioned in various angles or attitudes relative thereto.

The radio/player assembly 10 can be held to the clamp 11 by various means, including screws, rivets, clamps and the like. Preferably, however, the radio/player assembly 10 is held to the clamp by a thumbscrew for ready manual adjustment, tightening, loosening and especially removal of such assembly 10 from the clamp and associated cycle for safekeeping, as shown or indicated in FIGS. 1 and 4.

Accordingly, the radio/player assembly of the invention, is believed novel in that (1) it is readily removable from the clamp which mounts it to the bicycle as an anti-theft measure, (2) the invention has dual utility in the use thereof mounted to a cycle with pivotably positioned speakers, as shown in FIGS. 1 to 4 or off the cycle in a compact (monaural or) stereo set e.g. as shown in FIG. 5, (3) the radio/player holder 12, accomodates various radios or players previously owned by the user, (4) the assembly of the invention is pivotably mounted on the clamp assembly 11, so as to be readily mounted on bicycle handlebars or frame as discussed above and shown in the accompanying drawings and (5) the holder and speakers pivot on different axes so as to be positionable in numerous configurations relative to the cycle handlebars or frame in various open configurations and in compact configuration, the components at various angles and attitudes as discussed above and shown by example in the drawings.

The dual purpose radio/player assembly embodying the invention is also believed an improvement over the radio/player having earphones worn by e.g. cyclists, which prior art player of course, is unsafe as the cyclists' hearing of approaching vehicles is impaired.

What is claimed is:

1. A dual-use radio/player assembly for a cycle, comprising a radio/player holder, a clamp means mountable to a cycle, said holder being pivotably mounted to said clamp means, said holder having at least one speaker mounted thereon, said speaker being pivotably mounted to said holder at a point removed from where said holder pivotably mounts to said clamp means in a double pivoting action, said speaker having conductive means for electrically connecting with a radio or recording medium player mounted in said holder, said speaker being pivotable partly away from said holder in an open configuration and pivotable close to said holder in a compact configuration, said holder and speaker being readily detachable from said clamp as a theft-prevention measure.

2. The assembly of claim 1, wherein said holder has at least a pair of speakers pivotably mounted thereon.

3. The assembly of claim 2, wherein said assembly is pivotably mounted to the handlebars or frame of a cycle, said holder and said speakers being pivotable into a desired orientation.

4. The assembly of claim 1 being releasably attached to said clamp by a thumbscrew.

5. The assembly of claim 1, wherein said speakers are pivotable close to said holder in a compact configuration for off-cycle use.

6. The compact assembly of claim 5, having a radio or recording medium player mounted thereto to define a portable audio sound system.

7. The compact assembly of claim 6, wherein said assembly has a handle or strap mounted thereto for carrying purposes.

8. The assembly of claim 1 in combination with a radio or recording medium player mounted to said holder.

9. The combination of claim 8 in further combination with and mounted to a cycle.

10. The assembly of claim 3, wherein a pair of spaced speakers are pivotably mounted on said holder, which holder is in turn, pivotably and releasably mounted to said clamp.

11. The assembly of claim 3, wherein said holder is a plate and said speakers are pivotably mounted at spaced ears on said plate.

12. The assembly of claim 3, removably mounted by manual means, to the handlebars or frame of a cycle.

* * * * *